United States Patent [19]

Takeda

[11] Patent Number: 4,847,150
[45] Date of Patent: Jul. 11, 1989

[54] FOAMS OF POLYOLEFIN/POLYSTYRENE RESIN MIXTURE

[75] Inventor: Noboru Takeda, Suzuki, Japan

[73] Assignee: Asahi Kasei Kogyo Kabushiki Kaisha, Osaka, Japan

[21] Appl. No.: 168,122

[22] PCT Filed: May 14, 1987

[86] PCT No.: PCT/JP87/00303

§ 371 Date: Jan. 29, 1988

§ 102(e) Date: Jan. 29, 1988

[87] PCT Pub. No.: WO88/08864

PCT Pub. Date: Nov. 17, 1988

[51] Int. Cl.$^4$ .............................................. C08J 9/00
[52] U.S. Cl. .................................. 428/318.8; 264/53; 264/DIG. 5; 264/DIG. 18; 521/79; 521/81; 521/96; 521/134; 521/139; 521/140; 521/143; 521/146; 521/149; 525/80; 525/96; 525/98; 525/222
[58] Field of Search ............. 521/79, 81, 96, 134; 525/80, 96, 98, 222; 428/318.8

[56] References Cited

U.S. PATENT DOCUMENTS 4,020,025 4/1977 Zeitler et al. ................. 260/2.5

FOREIGN PATENT DOCUMENTS 1359740 7/1974 United Kingdom .

OTHER PUBLICATIONS

Search Report From PCT/JP 87/00303.

*Primary Examiner*—Morton Foelak
*Attorney, Agent, or Firm*—Armstrong, Nikaido, Marmelstein, Kubovcik & Murray

[57] ABSTRACT

A foam of a polyolefin/polystyrene resin mixture obtained by mixing a polyolefin resin and a polystyrene resin in the presence of a hydrogenated styrene/butadiene block copolyer, and subjecting the resultant mixed resinous composition to extrusion foaming, wherein;
(1) said hydrogenated styrene/butadiene block copolymer comprises, as components before hydrogenation, 10 to 38% by weight of styrene and butadiene with a content of 1,2-bond type butadiene of 20 to 50% by weight based on butadiene, and;
(2) said foam comprises a thin surface skin portion showing a value of 0.65 or more of the surface structural index S represented by the following formula:

$$S = t/T \geqq 0.65$$

wherein t and T each represent a total light-transmission evaluated according to the method of ASTM D1003 with respect to a surface skin layer and an inner layer of the foam, is found to have the cushioning properties (or the foam properties) that enables elastic cushioning of a large load.

1 Claim, 10 Drawing Sheets

―100μ―

―100μ―

|—1mm—|

|—100μ—|

FIG. IIA
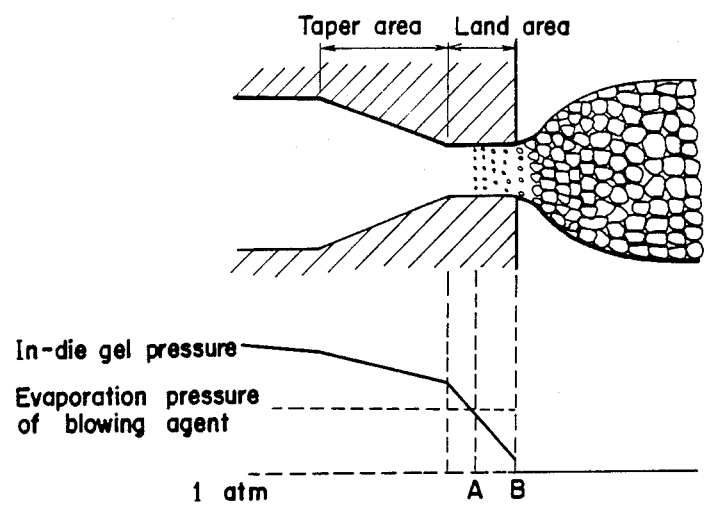
FIG. IIB
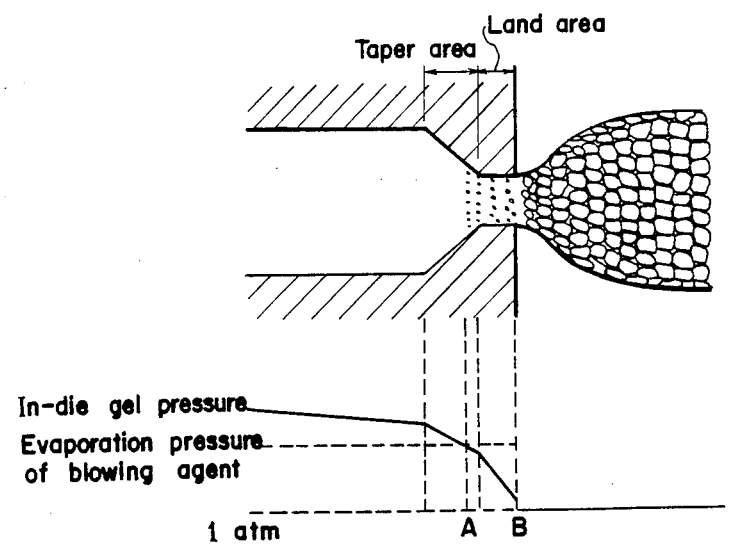

FOAMS OF POLYOLEFIN/POLYSTYRENE RESIN MIXTURE

TECHNICAL FIELD

This invention relates to an improved foams obtained by mixing polyolefin resins and polystyrene resins in the presence of a hydrogenated styrene/butadiene block copolymer, and then expanding the resultant by use of a blowing agent.

BACKGROUND ART

When plate-like foams of synthetic resins are used as cushioning materials for cushioning packages, there are two principles for achieving the cushioning performances thereof; namely, one of which is based on the buckling destruction of a foam, and the other of which is based on the elastic deformation of a foam, thereby absorbing impact stress to achieve the cushioning ability.

Since said principles utilize the foam properties that are contrary to each other, they have advantages and disadvantages that are contrary to each other, having their own technical fields for cushioning design, and are selectively used depending on what contents are to be cushioned.

Specifically, in the former case where rigid forms typified, for example, by polystyrene resin foams, there is an advantage such that a large load (i.e., a large stress) can be cushioned with relatively smaller supporting area (i.e., with a foam of a small volume), but, on the other hand, there is involved a disadvantage such that the foam cannot endure repeated impacts, or a space formed between contents and foams (i.e. cushioning materials) subjected to buckling deformation may cause "load dislocation", whereby the contents are frictionally damaged. Accordingly, such foams are frequently used for cushioning packages placed under good control during the course of the freight handling, and containing middle class heavy goods having the surface of high hardness.

In contrast, foams having the closed-cell structure, typically foams of polyethylene resins, are suited for use in the field utilizing flexibility and the repeated elastic recovery inherent in the foams of this sort, but are not suitable for cushioning of a large load. If, for example, the density of foams is increased in order to cope with such a difficulty, flexibility will be lost, and moreover, if they are used with increased supporting areas, the packaging style must be made to be of a large scale, resulting in losing economical merits in the various phases accompanied therewith to a great extent. Accordingly, foams of this sort are frequently used for cushioning packages in which only a high cushioning performance for light weight contents is required.

In designing the cushioning for such cushioning packages, improvement of foams which are cushioning materials has been sought after.

For example, if, in the field of the soft foams in which the above elastic deformation is desirably utilized, it be possible to provide foams having higher compression, strength (i.e., compression stress) than the conventional polyethylene foams, while sufficiently keeping the flexible recovery property (i.e., a low density or highly foamed product), it would be expected to widen the field of utilization of elastic cushioning for a larger load (i.e., heavier contents). Accordingly, to accomplish such foams, developments have been made for a long time for foams of resin compositions comprising a mixture of polyolefin resin and polystyrene resin, and also a number of means for mixing them has been proposed.

Since both of these resins are poor in compatibility with each other, it was impossible to obtain foams having good quality. Accordingly, there have been a large number of proposals for improvement of mixing conditions or improvement in how to copolymerize them in order to attain homogeneous dispersion of them.

Of the proposals, what should be noted is a technique disclosed in the specification of European Patent No. 55,460. This discusses how to physically disperse polyolefin resins and polystyrene resins, and mainly discloses a production method showing a mixing condition in which the character of combination of the resins to be mixed is governed by the relation between the ratio (R) of mutual rheological characteristics and the proportion (Y) of the content of styrene resins, and the relation between the density (D) of resultant foams and strength (F) under application of 25% compression.

The invention disclosed in the above patent has been assigned to the applicant of the present invention, and in part has been put into practical use and the product thereof has been made commercially available with a trademark "SUNTECK FOAM".

The commercially available product disclosed in the European patent has good performances as described in its specification, and has attracted attention as a product which has satisfied its target for the time being.

However, when it was put into a full-scale practical use, it was found that there were unexpected practical problems remained unsolved in the foams of resin mixtures obtained by the method of the above European patent.

That is, of the main problems, the first is a problem such that foams are subject to cracking due to repeated drop impacts (in particular, drop-on-corner) during transportation and no desired cushioning coefficient can be exhibited, the second is a problem such that the foams are subject to fatigue deformation due to repeated vibration impacts during transportation to cause "load dislocation", the third is a problem such that, when foams are die-cut to make cushioning materials, the surfaces thereof are cracked and destroyed along the outline of die cutting to lose the quality needed as a pad, and further the fourth is a problem such that, when foams are used as cushioning materials, foams are adhered to corrugated fiberboards in order to fix the cushioning materials to predetermined positions in a package, but the adhered foams are liable to peel therefrom with the result that no cushioning design value designed as a package is attained.

Accordingly, the foams according to the production method in said European patent has not been well accepted by the industry because they involved many restrictions in the manner of application.

The present inventors have presumed that these problems may have originated from the mutual incompatibility of the two resins, giving no fitness between the interfaces of the resins even if they may appear to have been integrated together, and accordingly a third substance would be necessarily required to be present in order to improve the mix of polyolefin resins and polystyrene resins. And, as a result of surveys and researches, they have taken a note of a technique disclosed in the U.S. Pat. No. 4,020,025; namely, a technical concept such that foams of resin mixtures of both of polyolefin resins and polystyrene resins are obtained in the presence of a hydrogenated styrene/butadiene block copolymer.

The reason therefor is as follows: The foams themselves disclosed in said U.S. patent involve insufficiencies from a practical viewpoint of properties when considering our aim to provide cushioning materials for use in the field of elastic cushioning under a large load (i.e., a high stress), namely, they have a number of drawbacks such that;

(a) cushioning materials are subject to deformation (by fatigue) due to repeated vibration impacts during transportation to cause the load dislocation;

(b) foams are subject to cracking due to repeated drop impacts;

(c) they are not suitable for use as cushioning materials in the direction to which a torsional stress or a shear stress is applied to the foam;

(d) they are subject to large creep to cause the load dislocation;

(e) when foams are die-cut, the surface portions are destroyed along the outline of die-cutting;

(f) they have poor adhesiveness to a corrugated fiberboard; and (g) when large compression is applied foams can not retain the original properties (such as strength).

Also, the level of quality possessed by them is not superior, or even inferior, to the foams disclosed in the above European patent. However, on the other hand, when the state of dispersion of polystyrene resins in the polyolefin resins was compared with that in the method of said European patent, there was a feel of the goodness in character as a material different from that of the foams obtained according to the method of said European patent or a possibility of achieving an improvement through a different route. Thus, it was decided to cope with the improvement of the foams disclosed in said U.S. patent.

DISCLOSURE OF INVENTION

Accordingly, this invention is an improvement of the known foams of resin mixtures disclosed in the U.S. Pat. No. 4,020,025, in which polyolefin resins and polystyrene resins are mixed in the presence of a hydrogenated styrene/butadiene block copolymer, and the resultant mixture is expanded. More specifically, this invention aims to solve all the problems or the drawbacks mentioned in the above (a) to (g) possessed by the conventional foams.

In other words, an object of this invention is to solve the above problems to provide a novel foam material that can exhibit the elastic cushioning performance under a large load (i.e., a high stress) and that has been sought after for a long time.

This invention relates to foams of polyolefin/polystyrene resin mixture, which is characterized by a foam of a polyolefin/polystyrene resin mixture obtained by mixing a polyolefin resin and a polystyrene resin in the presence of a hydrogenated styrene/butadiene block copolymer, and subjecting the resultant mixed resinous composition to extrusion foaming, wherein;

(1) said hydrogenated styrene/butadiene block copolymer comprises, as components before hydrogenation, 10 to 38% by weight of styrene based on total weight of said copolymer before hydrogenation, and butadiene containing 20 to 50% by weight of 1,2-bond type butadiene therein based on the total weight of butadiene, and;

(2) said foam comprises a thin surface skin portion showing a value of 0.65 or more of the surface structural index S represented by the following formula:

$$S = t/T > 0.65$$

wherein t and T each represent a total light-transmission evaluated according to the method of ASTM D1003 with respect to a surface skin layer and an inner layer defined below; said surface skin layer means a layer cut out from the surface of a foam (an original plate) at an inner side in the thickness-wise direction and in the thickness dimension of 3 times the dimension of an average cell diameter of said foam, and said inner layer means a layer cut out from a middle portion of said form excluding said surface skin layer in the thicknesswise direction and in the thickness dimension of 3 times the dimension of the average cell diameter of said foam; and said average cell diameter is determined by drawing a straight line having a length (L) measured in the thicknesswise direction of the middle portion of the foam, counting the number of cells across said straight line and making calculations based on the following formula, and is indicated by an average value obtained by repeating the calculations 10 times:

Cell diameter (mm) = 1.626 × L mm ÷ cell number. In particular, the invention resides in the combination of the above (1) and (2).

The above "L mm" indicates a minimum length necessary for representing the average cell diameter of the foam in good precision, and has not any technical meaning.

BRIEF DESCRIPTION OF THE DRAWINGS

FIGS. 11A and 11B are views of models showing the foaming procedures in a melt extrusion foaming;

BEST MODE FOR CARRYING OUT THE INVENTION

This invention will be described in detail with reference to the accompanying drawings and tables.

Figure 1:
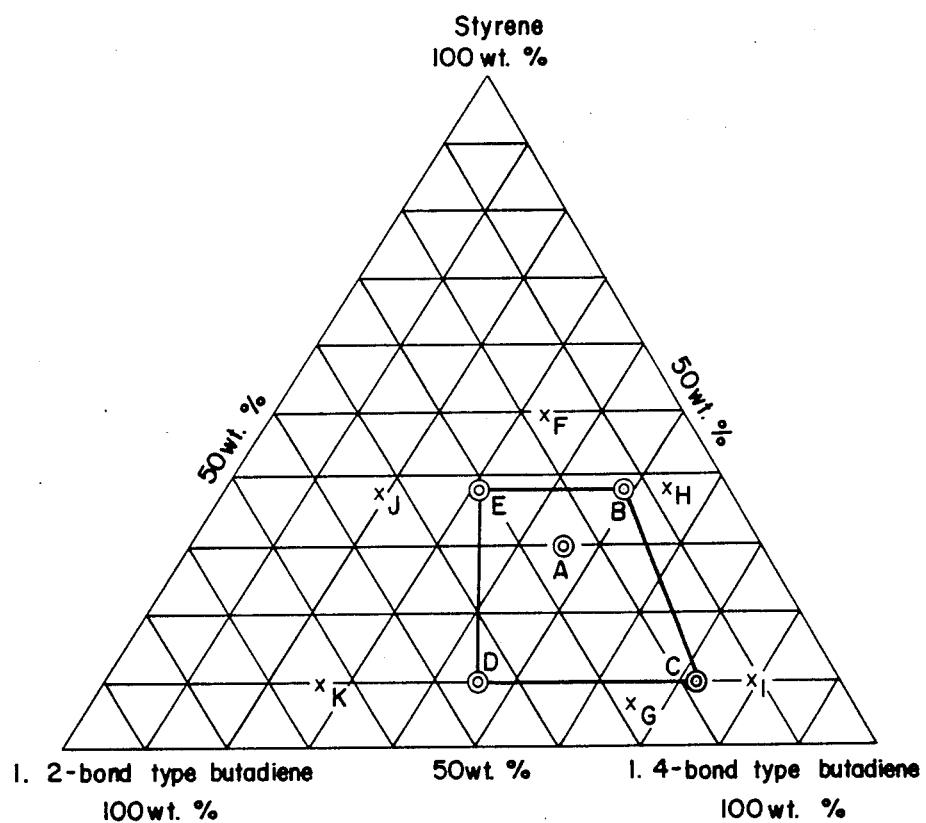
FIG. 1 is a triangular diagram showing the composition of components (styrene, 1,2-bond type butadiene and 1,4-bond type butadiene) in the hydrogenated styrene/butadiene block copolymer, before hydrogenation is effected.

FIG. 1 is a diagram establishing the importance of the contents for styrene, 1,2-bond type butadiene and 1,4-bond type butadiene as components before hydrogenation is effected, in the hydrogenated styrene/butadiene block copolymer defined in the above constitutional factor 1). This FIG. 1 is a (regular) triangular diagram showing the respective proportion for each of the components, held in the three component composition (100% by weight in total), in which the top apex represents a styrene component (100% by weight), the left apex a 1,2-bond type butadiene component (100% by weight) and the right apex a 1,4-bond type butadiene component (100% by weight). The mark ⊙ and the mark X in FIG. 1 correspond to the marks for overall evaluations in Table 2 summarizing the results obtained in Example 1 and Comparative Example 1, and are plotted on the coordinate points showing the components in styrene/butadiene copolymers in the samples used. Thus, FIG. 1 as a whole acts as an explanation diagram.

Namely, the mark ⊙ and the mark X indicate the evaluations made on foams as shown in FIG. 2, in which the mark ⊙ indicates a case where all of the respective properties, i.e., permanent set by repeated compression, compression strength retention after 80% compression, recovery after 80% compression, elongation at break and compression creep have reached the levels which can stand practical use, and the mark X indicates a case where some of these properties are unsatisfactory. Thus, the component scope in which the mark ⊙ are allotted may be said to be a component region necessary for achieving the object of this invention.

If the region is indicated by punctual coordinates for the styrene component, the 1,2-bond type butadiene component and the 1,4-bond type butadiene component (100% by weight in total), it can be demarcated by a quadrilateral region formed by connecting four points consisting of point B (38, 12.4, 49.6), point C (10, 18, 72), point D (10, 45, 45) and point E (38, 31, 31) with straight lines.

In other words, there is shown from the above demarcation in FIG. 1 the importance that the components, before hydrogenation is effected, in the hydrogenated styrene/butadiene block copolymer which is necessary for achieving the object of this invention, should comprise a styrene component in amount of 10 to 38% by weight, a 1,2-bond type butadiene component in amount of 12.4 to 45% by weight and a 1,4-bond type butadiene component in amount of 31 to 72% by weight (namely, the 1,2-bond type butadiene component held in the total butadiene component is in amount of 20 to 50% by weight).

FIG. 4, FIGS. 2A and 2B and FIG. 3 are each an example showing the difference in properties between a foam of the mark ⊙ (a foam of this invention) and a foam of the mark X (a comparative foam).

Figure 4:
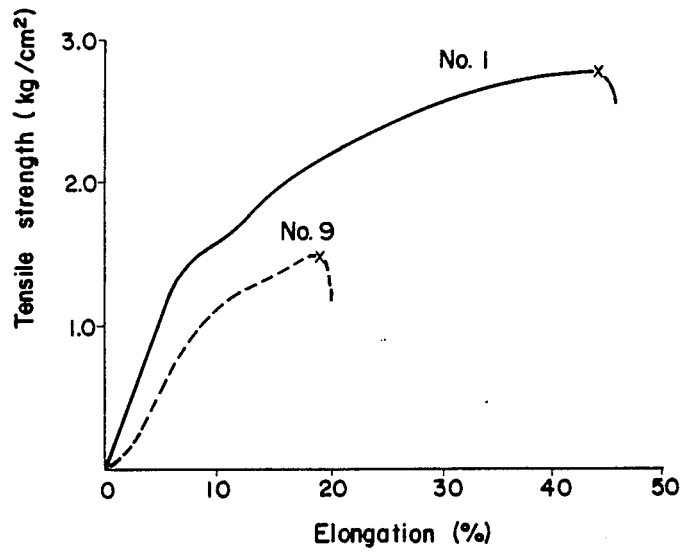
FIG. 4 is a graph showing the relation between the tensile strength and the elongation of a foam.

First, FIG. 4 is a graphic representation for experimental results showing the relationship between tensile strength and elongation, in which the mark X indicates that breaking has occurred. The solid line denotes a foam of this invention (No. 1) and the dotted line a comparative foam (No. 9).

According to the results in FIG. 4, there is demonstrated a part of the fact that the foam of this invention shows a high standard both in the elongation and the tensile strength as compared with a comparative product, and is a foam constituted of tough cell membranes.

Figure 2A:
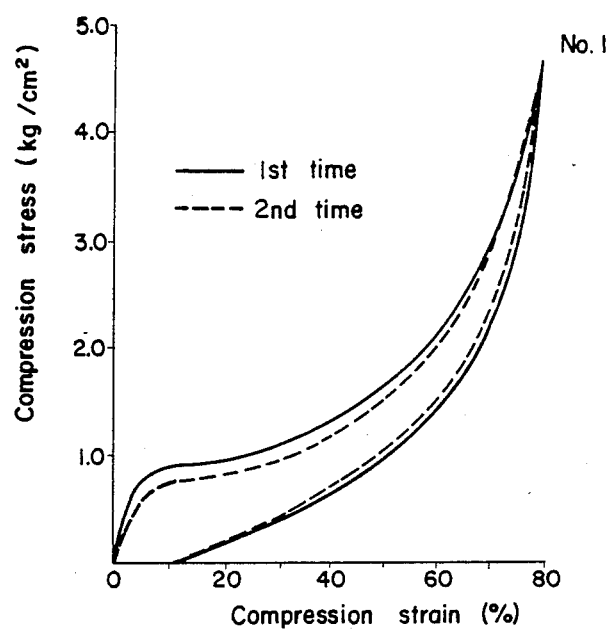
FIGS. 2A and 2B are graphs showing the relation between the compression stress and the compression strain of a foam.
Figure 2B:
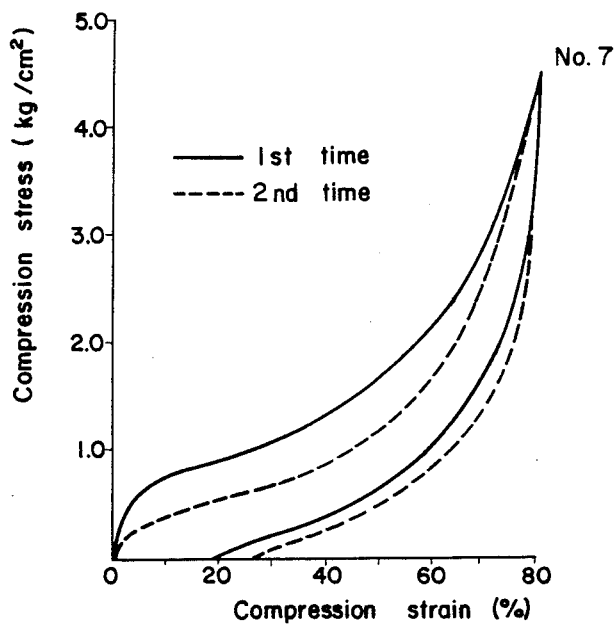

FIGS. 2A and 2B are graphic representation for experimental results showing the relation between stress and strain, in which the solid lines indicate values obtained when 80% compression was initially applied and the dotted lines denote values obtained when the compression was once recovered and thereafter 80% compression was again applied. FIG. 2A and FIG. 2B contrast the case of a foam of this invention (No. 1) and the case of a comparative product (No. 7).

As is apparent from the contrast between FIGS. 2A and 2B, the foam of the comparative product exhibits not only a large fatigue deformation (i.e., strain deformation) once a large compression (i.e., stress) is applied thereto, but also a great change in the property of the foam itself, but, on the other hand, the foam of this invention has been much improved in both of them.

This fact may demonstrate the following: when, for example, a foam is arranged into a desired shape as a cushioning material, a die-cutting processing is carried out, by which the foam is necessarily cut with a large compression because the foam is an elastic body. In such an occasion, in a conventional product, the deformation by compression at the time of cutting remains as strain, and also the foam properties are worsened. In contrast thereto, there has been achieved in the product of this invention a practical improvement such that the product is sufficiently endurable to the die-cutting processing.

Figure 3:
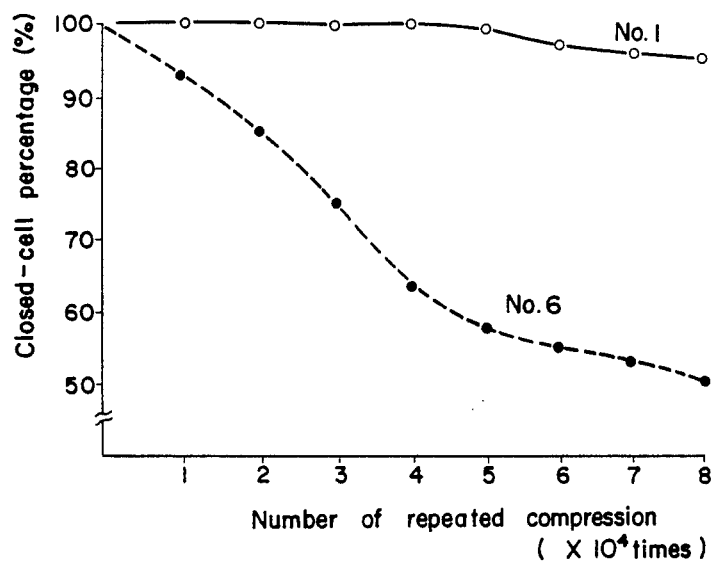
FIG. 3 is a graph showing the relation between the number of repeated compression and the closed-cell percentage after application of the compression on a foam.

FIG. 3 is also a graphic representation for experimental results showing the durability to repeated deformation, in which the solid line denotes the case of a product of this invention (No. 1) and the dotted line the case of a comparative product (No. 6). In this FIG. 3, the durability is represented by the change in the closed-cell percentage in a foam, relative to the number of repeated compression. As will be seen from the results shown in FIG. 3, the foam of this invention results in very little cell collapse (i.e., decrease in the closed-cell percentage) due to the repeated compression as compared with the comparative product, and therefore can exhibit initial foam properties maintained. Thus, it is seen that the product of this invention has been improved into a foam that can be used as a cushioning material utilizing the elasticity.

Figure 5:
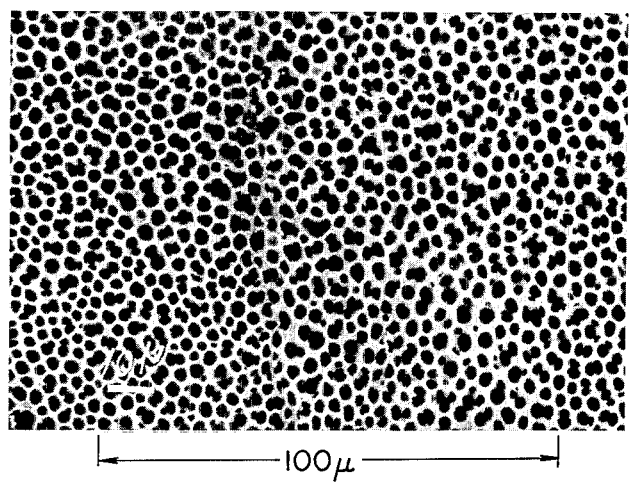
FIG. 5 and FIG. 6 are photographs each taken by an electron microscope of 750 magnifications to observe the particle structure of a section of a foam hot-pressed into a sheet.
Figure 6:
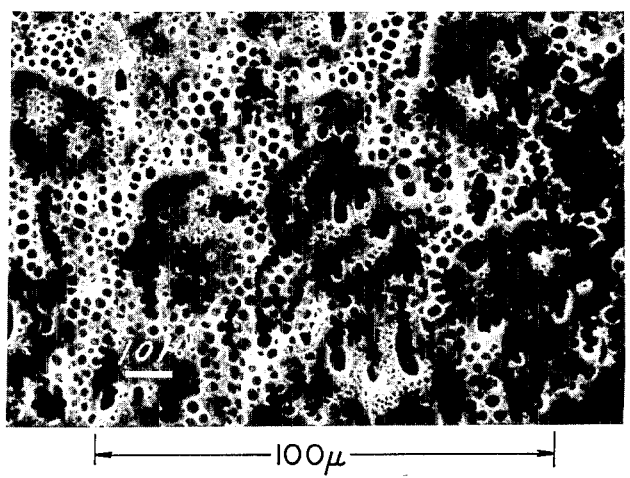

FIGS. 5 and 6 and FIGS. 7 and 8 each show a part of the reasons why the foams of this invention having been mentioned above are flexible and tough, in contrast to comparative products. First, FIGS. 5 and 6 are view each showing an observation by an electron microscope of 750 magnifications on a sample once obtained as a foam which was hot-pressed into a sheet, a section of the sheet having been washed with chloroform. FIG. 5 illustrates a case of a product of this invention, and FIG. 6 a case of a comparative product.

As shown by the contrast between FIG. 5 and FIG. 6, the mixed resins constituting the foam of this invention have been much better improved in their dispersion uniformity as compared with the comparative product. (The portion looking like a white network corresponds to the polyolefin resin component, and the portions looking like gray balls correspond to the traces of polystyrene particles that have been washed out.) There is well demonstrated how the state of dispersion is different.

Figure 7:
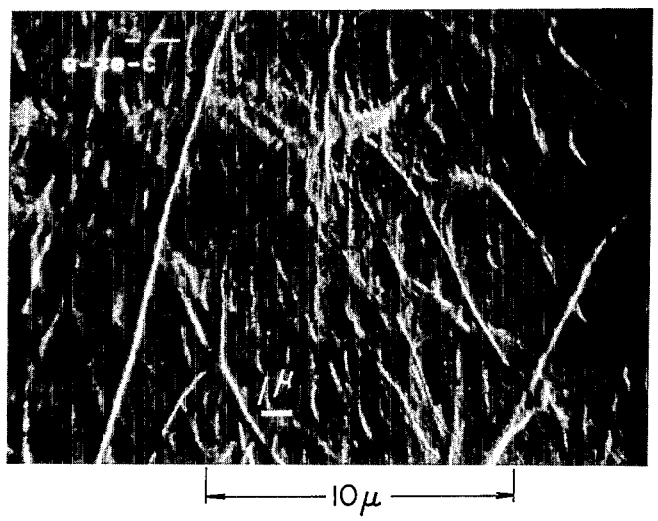
FIG. 7 and FIG. 8 are photographs each taken by an electron microscope of 5,000 magnifications to observe the state of dispersion of the mixed resins constituting cell membranes of a foam.
Figure 8:
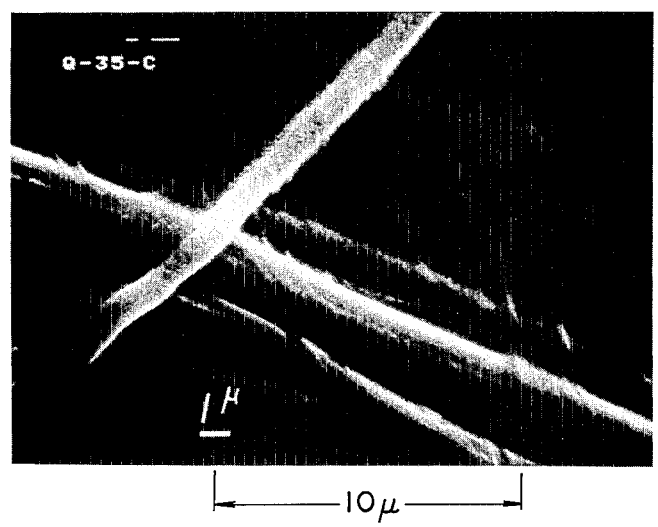

FIG. 7 and FIG. 8 are views each showing the difference between a product of this invention and a comparative product by contrasting the state of dispersion. In each case, a sheet of cell membrane is washed with chloroform so that only the portions corresponding to the polyolefin resin component may be exposed. Accordingly, the portions looking like fibers being entangled with each other are portions (an enlarged view of 5,000 magnifications) where the polyolefin components were present.

As will be understood by comparing these FIGS. 7 and 8, the fineness of dispersion reaches about as much as 10 times as compared with the comparative product.

In other words, it is presumed that, since in the foams of this invention the resins are very homogeneously and finely dispersed as compared with the conventional products, as shown by the contrasts between FIGS. 5 and 6 and between FIGS. 7 and 8, and yet such dispersion has been carried out in the presence of the hydrogenated styrene/butadiene block copolymer, cell membranes themselves have been endowed with flexible toughness to exhibit such an improvement effect in the foam properties as mentioned above. The real factor by which such an effect is exhibited resides in that there is employed the prescribed particular hydrogenated styrene/butadiene block copolymer which is shown in FIG. 1 as a relationship of the contents of three components.

The index S showing the surface structure of the foams of this invention will be explained below.

First of all, the index S itself is obtained by the following formula:

$$S = t/T > 0.65$$

t: Total light-transmission in the surface skin layer of a foam (according to ASTM D-1003)
T: Total light-transmission in the inner layer of a foam (according to ASTM D-1003)

This index S acts as a factor for distinguishing the invention from conventional arts. This will be explained below in detail.

Figure 9:
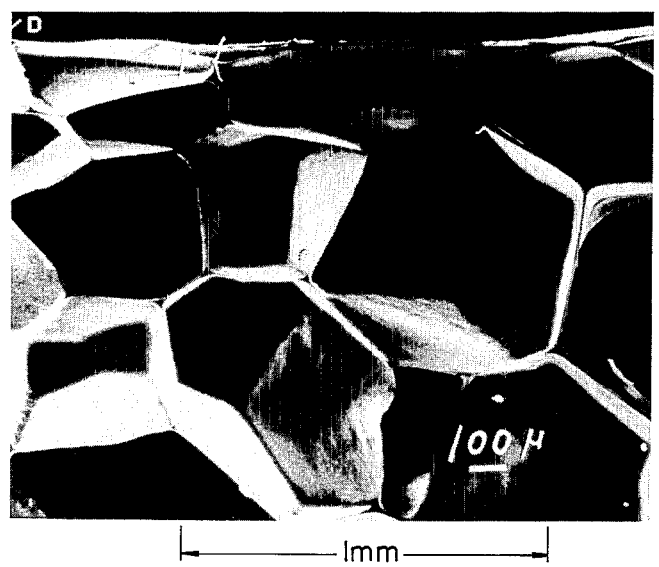
FIGS. 9I and 9II and FIGS. 10I and 10II are photographs each taken by an electron microscope of 60 magnifications and 185 magnifications, respectively, to observe the sectional cellular structure of a foam.
Figure 9:
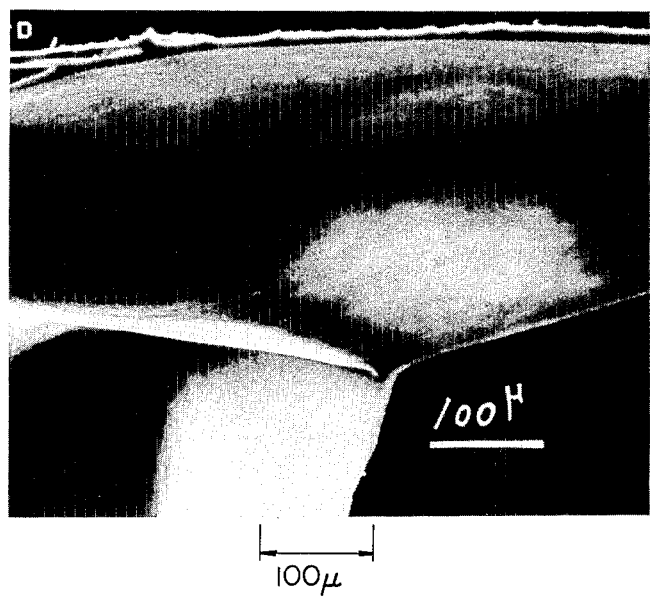

FIG. 9I and FIG. 9II are enlarged views of a foam designated as a product of this invention, in which FIG. 9I is a view showing the state of the surface portion (60 magnifications), and FIG. 9II is a view shown by further enlarging a surface portion (the portion marked by "P" in FIG. 9I (185 magnifications). These are arranged so that they may be correspondent respectively to FIG. 10I and FIG. 10II.

Also, both of these foams have the same composition for the resin components, which is the composition shown by point A (30, 24, 46) in the coordinates in FIG. 1. Accordingly, the difference itself between FIG. 9II (a product of the invention) and FIG. 10II (a comparative product) is the structural difference distinguishing the both from each other.

Figure 10:
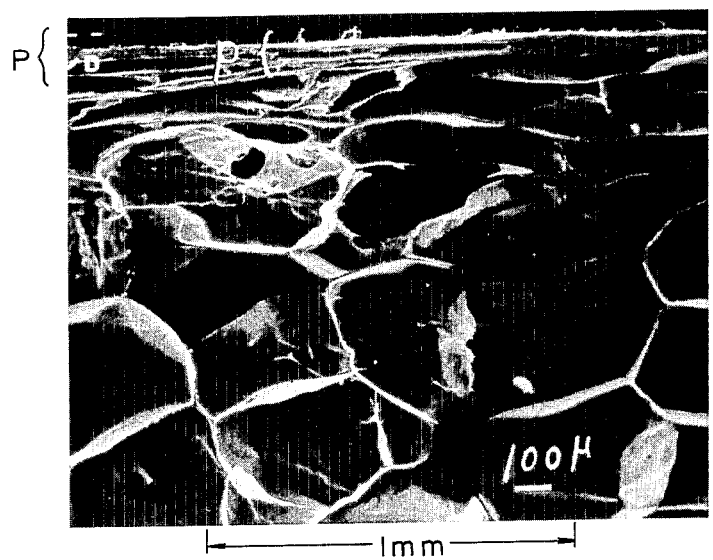
Figure 10:
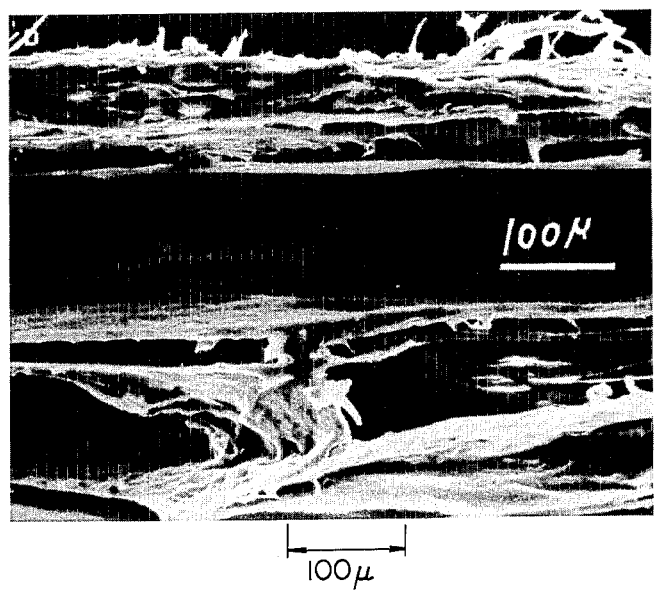

Carefully reviewing, it is well observed that the surface in FIG. 9II (a product of the invention) is constituted of a surface skin resembling to a cell membrane of a single component product, but, comparing therewith, the surface in FIG. 10II (a comparative product) is constituted of a number of collapsed cell membranes overlapping each other.

Now, the index S mentioned in this invention intends to represent the structural difference in the surface skin layers by a coefficient.

Namely, what is indicated by the quotient (t/T) of the total light-transmission t in the surface skin layer and the total light-transmission T in the inner layer means a relative ratio of a factor proportional to the number of cell membranes distributed to each of both the layers. Accordingly, both the layers are contrasted by slicing them in the thickness dimension (here, 3 times) relative to an average cell diameter of a foam, and those having no difference in a standard for measured values for t and T, in other words, those having a surface skin layer being closer to the state of a cell membrane of a single layer as in the inner layer (i.e., t/T being close to a value 1) are regarded as foams having desirable surface structure.

The results shown in Table 3 mentioned hereinbelow demonstrate a part of the facts that the S value must be 0.65 or more and is desirable when it is close to 1.

According to the results shown in Table 3, there has been established the significance in that the S value should be at least 0.65 and preferably 0.8 or more when considered from a viewpoint that, as practical properties of a foam, all of the bonding strength to a corrugated fiberboard, the resistance to surface cracking at the time of die-cutting processing, and the gloss (or beautifulness) of the foam surface are desirably kept at superior levels.

According to studies made by the present inventors, it is considered that the surface skin portion formed at the surface of an extruded foam is greatly concerned with the thin membrane extendability of resins which is governed by the dispersion compatibility between constituent resins. This is explained below with reference to FIG. 11.

FIGS. 11A and 11B are views showing a model illustrating how the foaming proceeds when a highly expanded foam is obtained according to a melt-extrusion foaming method in which molten resins containing a blowing agent are discharged through a die to a zone of atmospheric pressure and expanded, and also showing the relation with the pressure profiles of gels in the die when the foaming is carried out. In the foaming procedures, foamable cell nuclei are formed at the stage (A) where the gel pressure in the die becomes smaller than the vaporization pressure of the blowing agent, and then cell growth is started. The gels being in the course of cell growth are subject to the frictional resistance (i.e., shear stress) acting between them and a wall face of the die at the stage starting from (A) and reaching an outlet (B) of the die. In particular, it follows that the gels in the vicinity of the die wall face are subject to strong frictional resistance. In the case of an extruded foam comprised of a single component of polyolefin resins, intermolecular bonds are so strong that it can sufficiently endure the above-mentioned shear stress, and as a result the surface of a foam can be constituted of surface skins resembling to cell membranes of a single component product. However, in contrast thereto, in the case of a foam of a resin mixture comprising polyolefin resins and polystyrene resins having poor compatibility, the cell growth of polystyrene resins may proceed following the elongation of polyolefin resins, but, as the cell growth advances in the die, the incompatible portions at the interface between both the resins becomes unendurable to the frictional resistance acting between them and the die wall face, resulting in formation of surface skin structure in which a number of collapsed cell membranes overlap each other. This phenomenon occurs also in the system where the hydrogenated styrene/butadiene block copolymer which is a component to improve the compatibility between polyolefin resins and polystyrene resins is present. (This is presumably because no elasticity-improving effect is exhibited at such a high temperature range as the foaming temperature.) In order to prevent such a phenomenon, a die may be designed so that no excessive stress is applied to the gel in the course of cell growth. Also, studies have been made considering that it would be necessary to shorten the residence time in the die from the start of foaming to the arrival at the die outlet. As a result, it was found that the above phenomenon can be prevented by modifying the flow configuration of the gels in a die.

FIG. 11A shows a case where is used a die having a land of 4 mm long and a taper angle of 20°, by which a foam of this invention is obtained. FIG. 11B shows a case where is used a die having a land of 2 mm long and a taper angle of 45°, by which a comparative foam is obtained. As will be made apparent by contrasting these FIGS. 11A and 11B, in the case of the comparative product in FIG. 11B, the foaming starts within the tapered area, and the gels being in the course of cell growth are rapidly compressed when introduced into the land area and then reach a die outlet. In contrast thereto, in the case of the product of this invention, it is seen that the foaming starts in the land area, and the residence time in the die from the start of foaming to the arrival at the die outlet is short. Configuration of the die may vary depending on the composition of resin mixtures, the kind of blowing agents (i.e., the vaporization pressure), the expanding magnification and the cell diameter, and cannot be readily determined. However, in extruded foams of resin mixtures comprising polyolefin resins and polystyrene resins, it is necessary in order to attain the surface structure of the foams as in this invention to make smaller the taper angle so that no excessive force is applied abrubtly and to make appropriately longer the land so that foaming may not start within the taper area.

The surface skin portions of the above-mentioned conventional foams seems to be rigid and tough films at a glance. Accordingly good bonding can be attained when they are bonded to a corrugated fiberboard or the like through an adhesive. However, once a shear stress is applied thereto, the brittle fracture occurs at the inner side of a surface skin portion, whereby the foams are separated from the corrugated fiberboard in such a state that the surface skin portions are sufficiently adhered to the side of corrugated fiberboard, with the result of dislocation of the foams.

Also, when a foam is die-cut, a large tensile resistant energy is applied to a surface skin portion around a die-cut outline portion. On the other hand, however, the surface skin portion formed by a number of overlapping collapsed cell membranes has no elongation that can absorb the tensile resistant energy, and is kept in the region of the brittle fracture. As a result, the surface skin portion is cracked and destroyed. By the way, since the foams of this invention has no such surface skin portion, the problem of separation from corrugated fiberboard or the problem of cracking of outline portion, which the conventional foams have been involved in, is completely eliminated.

This problem in the surface skin portion is primarily a phenomenon occurring in an original plate for a foam. Accordingly, such a surface skin portion may be removed by cutting processing. However, since a cut loss amounting to 10 to 20% in both surfaces must be estimated with concurrent increase in the number of processing steps, the present invention that can be put into use as it is an original plate is very highly meaningful.

Figure 12:
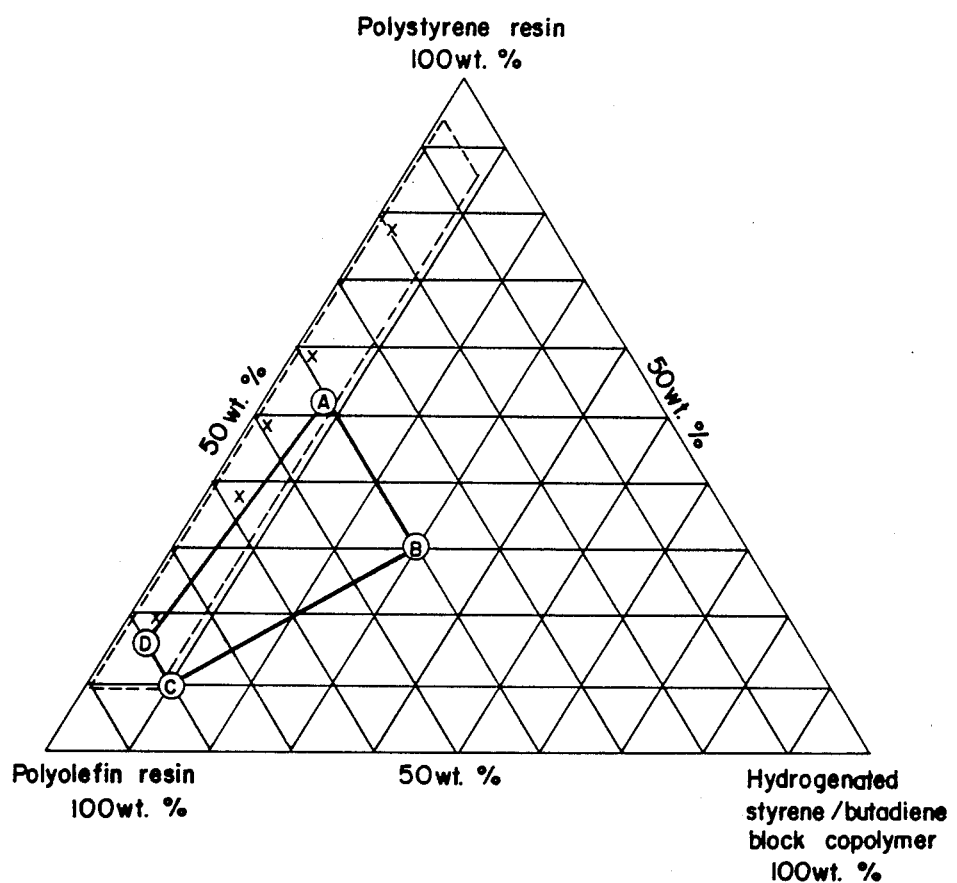
FIG. 12 is a triangular diagram showing the desired compositional scope in this invention, in the system of polystyrene - polyolefin - hydrogenated styrene/butadiene block copolymer.

FIG. 12 is a diagram to make clear the scope of the desired composition of components in this invention, relative to a region defined by a prior art, in the system of the present technical field, i.e., the system of a polystyrene resin - a polyolefin resin - a hydrogenated styrene/butadiene block copolymer.

That is, FIG. 12 is a (regular) triangular component diagram in which the top apex is calibrated as 100% by weight of a polystyrene resin, the left apex as 100% by weight of a polyolefin resin, and the right apex as 100% by weight of a hydrogenated styrene/butadiene block copolymer.

Accordingly, all the points in the diagram can be indicated as punctual coordinates consisting of a polystyrene component in % by weight, a polyolefin component in % by weight and a hydrogenated styrene/butadiene block copolymer (100% by weight in total).

In this FIG. 12, the region of the desired composition within which a foam of this invention is obtainable is indicated to be the scope defined by a quadrilateral defined by connecting point A (51, 40, 9), point B (30, 40, 30), point C (10, 80, 10) and point D (17, 80, 3) with solid straight lines. This region is defined for the purpose of satisfying the fundamental requirements such that a foam should have a higher compression strength relative to the foam density, should have a small quantity in the compression creep and should be free from the compression cracking.

In contrast thereto, the scope defined by the dotted lines in FIG. 12 correspond to the scope of the technical idea disclosed in the prior art U.S. Pat. No. 4,020,025. The marks X each indicate a position corresponding to an example disclosed therein.

The region assigned to this prior art and the scope desired in this invention are in such a relation that they overlap each other in part within the scope. However, the region of them extends to a different direction each other, and thus the technical idea itself among them is different in nature. Presumably, this difference has originated from the specific composition of components for the hydrogenated styrene/butadiene block copolymer used in this invention.

Figure 13:
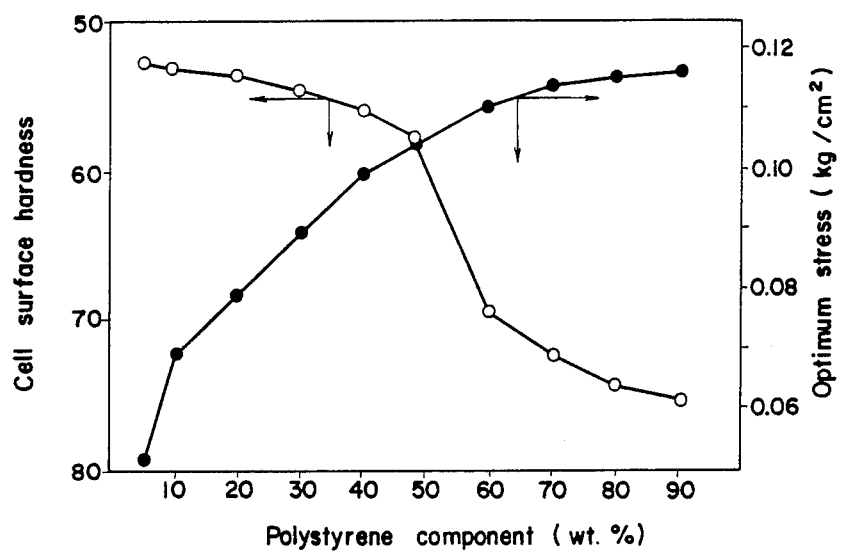
FIG. 13 and FIG. 14 are views of experimental results each showing an example of the relation between the resin composition shown in FIG. 12 and the properties of the resultant foam.
Figure 14:
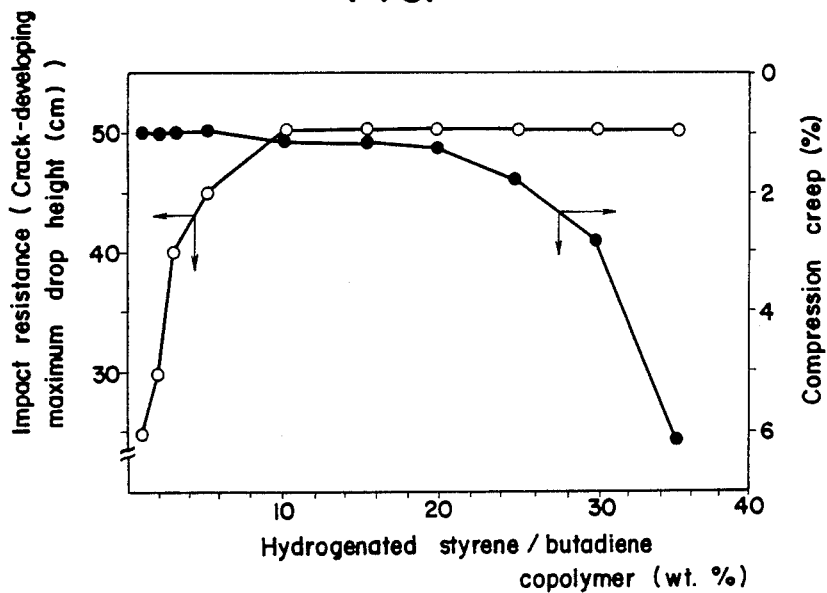

FIG. 13 and FIG. 14 are graphic representations for experimental results showing the relation between the resin composition shown in FIG. 12 and the properties of the resultant foams.

FIG. 13 shows influences by the amounts of polystyrene resin components when the amount of the hydrogenated styrene/butadiene block copolymer is kept constant to 10% by weight, and FIG. 14 shows influences by the amounts of hydrogenated styrene/butadiene block copolymers when the amount of polystyrene resin component is kept constant to 17% by weight, which are shown as trend views. Accordingly, with reference to the above trends, persons skilled in the art can produce foams fitted to their own cushioning designs by optionally selecting the composition of desired foams.

Table 4 sets forth overall evaluations of the properties that the foams of this invention have, and further establishes the utility of the foams of this invention by contrasting them with commercially available foams or the prior art foams.

From the results shown in Table 4, it is seen that the foams of this invention satisfy, with values of high levels, all of the foam properties required for cushioning materials in the field of elastic cushioning under a large load (or a high stress), namely, the properties such as difficulty of crack development to endure repeated drop impacts (i.e., the resistance to shear impact), difficulty of to fatigue deformation to maintain the dimension (or dimensional characteristics) even when repeated vibration impacts are applied (i.e., resistance to vibration impact), little lowering of the performance after die-cutting processing (i.e., diecutting workability) and no separation of cushioning materials (i.e., bonding strength to corrugated fiberboard), and also, the repeatable cushioning performance and the compression creep.

Also, these required properties are provided in a degree much superior to any conventional foams of similar system, and there is shown the usefulness as cushioning materials in the field of elastic cushioning under a large load.

The polyolefin resins referred to in this invention are preferably homopolymers of high-, medium- or low-pressure polyethylenes or polypropylenes, and may include an ethylene/propylene copolymer, an ethylene/vinyl acetate copolymer, copolymers mainly composed of olefin, with monomers such as acrylate, methacrylate and butene copolymerizable with the olefin, and a mixture of these. There is no limitation in M.I. of the polyolefins to be used, but it is preferably in the range between 0.02 to 8 g/10 min (190° C.×2.16 kg). Also, the polystyrene resins are preferably homopolymers of styrene, and may include copolymers mainly composed of styrene, with monomers such as $\alpha$-methylstyrene, acrylonitrile, butadiene and methyl methacrylate copolymerizable with styrene, and a mixture of these. There is also no limitation in M.F.R. of the polystyrenes to be used, but it is preferably in the range between 0.6 to 20 g/10 min (200° C.×5 kg).

The hydrogenated styrene/butadiene block copolymer mentioned in this invention refers to the one whose component region is within the scope mentioned before, and may be of either perfect block structure (i.e., pure type) or tapered block structure (i.e., taper type). The content of conjugated dienes in the butadiene units is preferably less than 5% before hydrogenation is effected, in other words, a 95% or more hydrogenated block copolymer is preferred. The weight average molecular weight measured by the GPC thereof is preferably 10,000 to 150,000 when taking into consideration the mixing dispersibility of polyolefins and polystyrenes. This block copolymer can be synthesized by the method disclosed in U.S. Pat. No. 4,501,857. Analysis of components in the resultant copolymer can be also carried out by a method disclosed therein.

As a method of mixing the above resins and foaming the same, there may be employed, for example, a method in which a volatile organic blowing agent is mixed at high temperature and under high pressure in the object resins to be mixed, and the resultant mixture is cooled to a suitable foaming temperature and then subjected to extrusion foaming under atmospheric pressure. The object resins used may be mixed by homogeneously blending particles or powder of the respective constituent resins by use of a blender, or by melt-blending the resins once having been passed through a kneading extruder, or by melt-blending only the two components, polystyrene and hydrogenated styrene/butadiene block copolymer, and thereafter dry-blending the polyolefin resin. Any of these method may be employed.

The volatile organic blowing agent used here includes aliphatic hydrocarbons, chlorinated hydrocarbons, fluorinated and chlorinated hydrocarbons, aliphatic alcohols, ethers, esters or a mixture of these, having a boiling point lower than a softening point of resins, and there may be preferably used, for example, butane, methyl chloride, methylene chloride, dichlorotetrafluoroethane, trichlorofluoromethane, dichlorodifuluoromethane, chlorodifluoromethane, dichlorofluoromethane, chlorodifluoroethane, or a mixture of these.

The mixing proportion of the above volatile organic blowing agent in the compositions of this invention ranges between 10 to 60 parts by weight based on 100 parts by weight of resins, and may be optionally selected depending on the aimed density. The density of a foam obtainable in this invention is preferably in the range between 10 to 100 kg/m$^3$. If it is less than 10 kg/m$^3$, the compression creep becomes extremely large, or if it is more than 100 kg/m$^3$, the performance lowering rate after punching processing becomes extremely great, undesirably.

If necessary, the compositions of this invention may contain a nucleating agent conventionally used. As the nucleating agent, there may be used, for example, inorganic fine powder such as talc and silicon dioxide, organic fine powder such as zinc stearate, calcium stearate, or fine powder capable of generating gas by heating, such as citric acid and sodium hydrogen carbonate. Besides, a UV-ray absorber, an antioxidant, an antistatic agent, a colorant, etc., may also be contained, if desired.

In the following, the method for evaluations and the measure or standard of evaluations for the characteristic values will be shown.

Recovery and compression strength retention after 80% compression:

According to JIS-K6767, 80% compression is applied to a test piece at the rate of 10 mm/mm, and an instantaneous compression pressure (y1) when a compression strain reaches 25% is measured and recorded. Immediately, the load is removed at the same rate to record the strain quantity (x1%) when the stress becomes zero. After the same test piece is allowed to stand for 1 minute, compression is again applied at the rate of 10 mm/mm to record a compression pressure (y2) when the compression strain reaches 25%, and calculations are carried out based on the following formulas to make evaluations. (Average of n=3)

Recovery (%) after 80% compression = 100 − x1

Compression strength retention (%) = y2/y1 × 100

Compression strength retention after 80% compression:

| Ranks of evaluation | Symbol |
|---|---|
| 80% or more | ⊙ |
| Less than 80% to 75% or more | ○ |
| Less than 75% to 70% or more | △ |
| Less than 70% | X |

Recovery after 80% compression:

| Ranks of evaluation | Symbol |
| --- | --- |
| 90% or more | ⊙ |
| Less than 90% to 85% or more | ○ |
| Less than 85% to 80% or more | Δ |
| Less than 80% | X |

Permanent set by repeated compression:

According to JIS-K6767, a test piece is placed between parallel flat plates in a repeatable compression test machine, and compression is continuously repeated 80,000 times at the rate of 60 times per minute and to 50% of the initial thickness of the test piece. After the test piece was allowed to stand for 24 hours at a place of standard conditions (23° C., 60% RH), the thickness thereof is measured, and then calculations are carried out based on the following formula to make evaluations. (Average of n=5)

Permanent set by repeated compression (%) =

$$\frac{\left(\begin{array}{c}\text{Initial thickness} \\ \text{of test piece}\end{array} - \text{Thickness after test}\right)}{\text{Initial thickness of test piece}} \times 100$$

| Ranks of evaluation | Symbol |
| --- | --- |
| 25% of less | ⊙ |
| Exceeding 25% and 30% or less | ○ |
| Exceeding 30% and 35% or less | Δ |
| Exceeding 35% | X |

Elongation at break:

According to method (A) in JIS-K6767, a dummbbell-shaped test piece sample of 6 mm thick and having about 40 mm of a parallel portion at the middle (i.e., distance between gages) is set to a tensile tester. The test piece is drawn at the tensile rate of 500 mm/mm to measure the distance between gages when ruptured, and calculations are carried out based on the following formula to make evaluations. (Average of n=5)

Elongation at break (%) =

$$100 \times \frac{\left(\begin{array}{c}\text{Distance between gages} \\ \text{before test}\end{array} - \begin{array}{c}\text{Distance between gages} \\ \text{when ruptured}\end{array}\right)}{\text{Distance between gages before test}}$$

| Ranks of evaluation | Symbol |
| --- | --- |
| 40% or more | ⊙ |
| Less than 40% to 30% or more | ○ |
| Less than 30% to 20% or more | Δ |
| Less than 20% | X |

Closed-cell percentage:

Measurement is carried out according to the air pycnometer (produced by Beckman Co.; Model 930) disclosed in ASTM-D2856. (n=5)

Compression creep:

According to JIS-K6767, the thickness when a load of 0.1 kg/cm² is applied is designated as $t_0$ and the thickness after lapse of 24 hours as $t_1$, and calculations are carried out based on the following formula to make evaluations. (Average of n=3)

$$\text{Compression creep (\%)} = \frac{(t_0 - t_1)}{t_0}$$

| Ranks of evaluation | Symbol |
| --- | --- |
| 2.0% or less | ⊙ |
| Exceeding 2.0% and 4.0% or less | ○ |
| Exceeding 4.0% | X |

Bonding strength to corrugated fiberboard:

Surfaces of A-flute corrugated fiberboard plate and a surface skin portion of a test piece (an extruded foam original plate) each were coated with a hot-melt adhesive (Mertack F1070; produced by Tokyo Kozai K.K.) in amount of 200 g/m², and are bonded under pressure. (The size of the test piece is 50×50 mm.) Both of top and back surfaces of the thus laminated plates are adhered to be fixed to a tensile jig made of steel with use of an epoxy adhesive. After being allowed to stand for 24 hours at a place of standard conditions (23° C., 60% RH), the test sample is set to a tensile tester and drawn at the tensile rate of 10 mm/mm until it is ruptured, to find the maximum strength (kg/cm²). Evaluations are made according to the following: (Average of n=5)

| Standard of evaluation | Symbol |
| --- | --- |
| 2.0 kg/cm² or more | ⊙ |
| Less than 2.0 kg/cm² to 1.5 kg/cm² or more | ○ |
| Less than 1.5 kg/cm² | X |

Die-cutting workability:

A test piece (an extruded foam original plate) of 40 mm thick is placed on a press blade having a height of 7 mm and a thickness of 1.2 mm so that the surface of the surface skin portion may be in contact with it, and the test piece is instantaneously die-cut out with 85% compression with use of a hydraulic press machine. Appearance of the die-cut outline portions is observed to make evaluations according to the following:

| Ranks of evaluation | Symbol |
| --- | --- |
| No crack and destruction seen at all at the surface layer portion | ⊙ |
| Part of surface layer portion destroyed | ○ |
| Cracked and destroyed at the surface layer portion extremely | X |

Beautifulness (i.e., gloss)

The surface of the surface skin portion of a test piece (an extruded foam original plate) is applied to a gloss meter VG-10 produced by Nippon Denshyoku Kogyo K.K., adjusting irradiation angle to 45°, to measure the reflectance, and evaluations are made according to the following standard:

| Ranks of evaluation | Symbol |
| --- | --- |
| 15% or more | ⊙ |
| Less than 15% to 10% or more | ○ |
| Less than 10% to 5% or more | Δ |
| Less than 5% | X |

Rate of lowering repeatable cushioning performance:

According to JIS Z-1235, a test piece of 40 mm thick is successively dropped 5 times from a drop height of 60 cm to obtain curves for the relation between the maximum acceleration and the static stress for each of the first drop and the second to fifth drop, and the rate of change in the maximum acceleration under optimum stress is calculated based on the following formula to make evaluations. (Average of n=3)

Lowering rate (%) =

$$\frac{\left(\begin{array}{c}\text{Maximum acceleration} \\ \text{at 2nd to 5th drop}\end{array} - \begin{array}{c}\text{Maximum acceleration} \\ \text{in 1st drop}\end{array}\right)}{\text{Maximum acceleration at 1st drop}} \times 100$$

| Standard of evaluation | Symbol |
| --- | --- |
| 15% or less | ⊙ |
| Exceeding 15% and 25% or less | ○ |
| Exceeding 25% and 35% or less | Δ |
| Exceeding 35% | X |

Rate of deterioration of performance after die-cutting working:

A test piece of 40 mm thick is instantaneously subjected to application of 80% compression by use of a crank press machine. After the test piece thus treated was allowed to stand for 24 hours under the standard conditions (23° C., 60% RH), the foregoing cushioning performance test (drop height: 60 cm; dropped once) is carried out to find the maximum acceleration under optimum stress, and the deterioration rate relative to the cushioning performance achieved when no 80% compression is applied is calculated based on the following formula to make evaluations. (Average of n=3)

Deterioration rate (%) =

$$100 \times \frac{\left(\begin{array}{c}\text{Maximum acceleration} \\ \text{of test strip with 80\%} \\ \text{compression application}\end{array} - \begin{array}{c}\text{Maximum acceleration of} \\ \text{test strip without 80\%} \\ \text{compression application}\end{array}\right)}{\text{Maximum acceleration of test strip without}}$$
$$\text{80\% compression application}$$

| Ranks of evaluation | Symbol |
| --- | --- |
| 15% or less | ⊙ |
| Exceeding 15% and 20% or less | ○ |
| Exceeding 20% and 30% or less | Δ |
| Exceeding 30% | X |

Resistance to vibration impact:

A test piece is fitted to a vibration test machine (produced by MTS Company; 840-02A) for 60 minutes under the conditions of load: 0.1 kg/cm$^2$, number of vibration: 10 Hz, and vibration impact value: 2.5 G, to immediately measure the thickness of the test piece, and calculation are carried out based on the following formula to make evaluations. (Average of n=3)

Thickness retention (%) =

$$\frac{\text{Thickness of test piece after vibration test}}{\text{Initial thickness of test piece}} \times 100$$

| Ranks of evaluation | Symbol |
| --- | --- |
| 70% or more | ⊙ |
| Less than 70% to 60% or more | ○ |
| Less than 60% to 50% or more | Δ |
| Less than 50% | X |

Resistance to shear impact:

A corner pad having a thickness of 30 mm and an inner dimension of 70×70×70 mm is processed for adhesion by use of a hot-melt adhesive, and attached to a triangular pyramid type dummy. Under the conditions of a static stress of 0.05 kg/cm$^2$ calculated for a plane (70×70 mm), corner dropping is carried out while varying drop height by 5 cm for each drop to find maximum drop height at which no cracking occurs in the corner pad test body, and evaluations are made as in the following table.

| Ranks of evaluation | Symbol |
| --- | --- |
| 50 cm or more | ⊙ |
| Less than 50 cm to 40 cm or more | ○ |
| Less than 40 cm to 30 cm or more | Δ |
| Less than 30 cm | X |

Cell surface hardness tester:

Using a rubber hardness tester (Type C), 10 point measurements for hardness of cell surfaces in an inner layer portion of a foam are carried out, and the hardness is indicated by its average value.

Optimum stress:

According to JIS Z-1235, a test piece of 40 mm thick is dropped once from a drop height of 60 cm to obtain curves for the relation between the maximum acceleration and the static stress, and an optimum stress is represented by a stress at which the maximum acceleration shows a lowest value.

EXAMPLE 1, COMPARATIVE EXAMPLE 1

A mixture of 52% by weight of low density polyethylene (produced by Asahi Kasei K.K.; Q902; M.I.=0.3; density: 0.920 g/cc), 35% by weight of polystyrene (produced by Asahi Kasei K.K.; Styron 605; M.F.R.=1.5) and 13% by weight of a hydrogenated styrene/butadiene block copolymer A was continuously fed to an extruder having a bore of 65 mm at the rate of 60 kg/hr together with 60 g/hr of talc to carry out melt kneading, and also, from an inlet for a blowing agent provided at the tip end of the extruder, a blowing agent mixture composed of dichlorodifluoromethane and methylene chloride in molar ratio of 8:2 was continuously introduced under pressure and at the rate of 13 kg/hr to carry out melt kneading at high temperature and under high pressure. Thereafter, the resultant melt was cooled to 108° C. in a cooling device, and extruded through a die comprising a slit of 2.8 mmt×50 mmW, a land of 4 mmL and a taper angle of 20° to a zone of atmospheric pressure to effect expanding. Shear stress (ΔP×t/2L) at the land portion was found to be 2.88 kg/cm$^2$. There was obtained a foam having a thickness of 50 mm, a width of 150 mm, a density of 25 kg/m$^3$ and an average cell diameter of 1.0 mm, which was homogeneous and of high commercial value. This is designated as Sample No. 1.

Foams having a density of about 25 kg/m$^3$ and an average cell diameter of 1.0 mm were obtained in the same procedures as mentioned above except that the hydrogenated styrene/butadiene block copolymer to be butadiene component having 20 to 50% by weight of 1,2-bond type butadiene content.

TABLE 1

|   | Content of styrene component (wt. %) | Content of (a) 1,2-bond type butadiene component (wt. %) | Content of (b) 1,4-bond type butadiene component (wt. %) | 100 (a)/ (a) + (b) (%) | Weight average molecular weight (ten thousand) | Hydrogenation percentage (%) |
|---|---|---|---|---|---|---|
| A | 30.0 | 24.0 | 46.0 | 34.3 | 4.7 | 100 |
| B | 38.0 | 12.4 | 49.6 | 20.0 | 4.2 | 100 |
| C | 10.0 | 18.0 | 72.0 | 20.0 | 6.5 | 100 |
| D | 10.0 | 45.0 | 45.0 | 50.0 | 6.2 | 98 |
| E | 38.0 | 31.0 | 31.0 | 50.0 | 3.5 | 100 |
| F | 50.0 | 18.0 | 32.0 | 36.0 | 3.8 | 100 |
| G | 6.0 | 28.0 | 66.0 | 29.8 | 5.5 | 100 |
| H | 38.0 | 7.0 | 55.0 | 11.3 | 4.0 | 100 |
| I | 10.0 | 10.0 | 80.0 | 11.1 | 6.5 | 100 |
| J | 38.0 | 42.0 | 20.0 | 67.7 | 3.6 | 100 |
| K | 10.0 | 63.0 | 27.0 | 70.0 | 6.0 | 98 |

TABLE 2

| No. | Hydrogenated styrene/ butadiene block copolymer used | Compression strength retention after 80% compression (%) | Recovery after 80% compression (%) | Permanent set by repeated compression (%) | Elongation at break (%) | Closed cell percentage (%) | Compression creep (%) | Overall evaluation |
|---|---|---|---|---|---|---|---|---|
| 1 | A | 83 ◉ | 88 ○ | 23 ◉ | 43 ◉ | 100 | 1.1 ◉ | ◉ |
| 2 | B | 87 ◉ | 91 ◉ | 26 ○ | 36 ○ | 100 | 0.9 ◉ | ◉ |
| 3 | C | 78 ○ | 90 ◉ | 20 ◉ | 38 ○ | 100 | 1.5 ◉ | ◉ |
| 4 | D | 77 ○ | 90 ◉ | 22 ◉ | 39 ○ | 99 | 2.3 ○ | ◉ |
| 5 | E | 88 ◉ | 91 ◉ | 27 ○ | 45 ◉ | 98 | 2.1 ○ | ◉ |
| 6 | F | 80 ◉ | 84 △ | 36 x | 42 ◉ | 100 | 0.8 ◉ | x |
| 7 | G | 61 x | 82 △ | 29 ○ | 48 ◉ | 99 | 1.5 ◉ | x |
| 8 | H | 81 ◉ | 84 △ | 29 ○ | 16 x | 100 | 1.3 ◉ | x |
| 9 | I | 75 ○ | 77 x | 24 ◉ | 18 x | 100 | 1.8 ◉ | x |
| 10 | J | 82 ◉ | 83 △ | 28 ○ | 32 ○ | 83 | 4.5 x | x |
| 11 | K | 76 ○ | 82 △ | 25 ◉ | 34 ○ | 80 | 6.0 x | x | used was replaced by B, C, D, E, F, G, H, I, J and K in Table 1. These were serially numbered as No. 2 to No. 11, and each of the compression strength retention after 80% compression, recovery after 80% compression, permanent set by repeated compression, elongation at break, closed-cell percentage and compression creep was evaluated together with those for Example 1 according to the methods as described above. Results are shown in Table 2. Symbols of the overall evaluations in Table 2 are plotted on the component coordinates for the styrene/butadiene copolymer, as components before hydrogenation was effected, to obtain FIG. 1. According to FIG. 1 and Table 2, it is understood that, the foams satisfying all of the respective compression strength maintenance rate after application of 80% compression, the recovery rate after application of 80% compression, the permanent distortion by repeated compression, the breaking elongation in tensile test, the closed-cell percentage and the compression creep are obtained only when there is used the hydrogenated styrene/butadiene block copolymer comprising, as components before hydrogenation is effected, a styrene component in amount of 10 to 38% by weight and a

EXAMPLE 2, COMPARATIVE EXAMPLE 2

Foams were produced in the same manner as in Example 1 except that the land and the taper angle of dies to be used were modified to 5.0 mmL and 30°, 3.0 mmL and 30°, 3.0 mmL and 45°, 2.0 mmL and 45° and 1.5 mmL and 30°, respectively. These were serially numbered as No. 12 to No. 16. The shear stress ($\Delta P \times t/2L$) at the respective land portions were found to be 2.81 kg/cm² in No. 12, 3.0 kg/cm² in No. 13, 3.15 kg/cm² in No. 14, 3.30 kg/cm² in No. 15, 3.52 kg/cm² in No. 16. These foams were subjected, together with the foam of No. 1, to evaluation tests for bonding strength to corrugated fiberboard, the die-cutting workability and the beautifulness, following the test methods as described in the body of this specification. Results are shown in Table 3 together with the index S indicating the surface structure. From Table 3, it is understood that there can not be obtained foams of good quality, satisfying all of the resistance to surface cracking at die-cutting processing and the gloss (or beautifulness) of foam surface, unless S is kept to at least 0.65, preferably, 0.8 or more being close to 1.

TABLE 3

| No. | S | Bonding strength to corrugated fiberboard (kg/cm²) | | Die-cutting workability (Resistance to surface cracking) | Beautifulness (Gloss) | | Overall evaluation |
|---|---|---|---|---|---|---|---|
| 1 | 0.85 | 2.5 | ◉ | ◉ | 16 | ◉ | ◉ |
| 12 | 0.81 | 2.4 | ◉ | ◉ | 15 | ◉ | ◉ |
| 13 | 0.76 | 2.2 | ○ | ◉ | 12 | ○ | ○ |
| 14 | 0.65 | 1.9 | ○ | ◉ | 10 | ○ | ○ |
| 15 | 0.57 | 1.4 | x | △ | 7 | △ | x |

TABLE 3-continued

| No. | S | Bonding strength to corrugated fiberboard (kg/cm²) | Die-cutting workability (Resistance to surface cracking) | Beautifulness (Gloss) | Overall evaluation |
| --- | --- | --- | --- | --- | --- |
| 16 | 0.49 | 1.1　x | x | 4　x | x |

EXAMPLE 3

To a mixture of 52% by weight of high density polyethylene (produced by Asahi Kasei K.K.; B870; M.I.=0.3; density: 0.960 g/cc), 35% by weight of polystyrene (produced by Asahi Kasei K.K.; Stylon 605; M.F.R.=1.5) and 13% by weight of a hydrogenated styrene/butadiene block copolymer A, 0.1% by weight of talc was added as a nucleating. The resultant mixture was dryblended in a Henschel mixer and then thoroughly kneaded in a kneading extruder to obtain a resin mixture as a base material. The base material mixture obtained was continuously fed to an extruder having a bore of 65 mm at the rate of 60 kg/hr to carry out melt kneading, and also, from an inlet for a blowing agent provided at a tip end of the extruder, a blowing agent mixture composed of dichlorotetrafluoroethane and methylene chloride in molar ratio of 7:3 was continuously introduced under pressure and at the rate of 21.7 kg/hr to carry out melt kneading at high temperature and under high pressure. Thereafter, the resultant melt was cooled to 128° C. in a cooling device, and extruded through a die comprising a slit of 2.8 mmt×50 mmW, a land of 4 mmL and a taper angle of 30° to a zone of atmospheric pressure to effect expanding. Shear stress ($\Delta P \times t/2L$) at the land portion was found to be 3.2 kg/cm². There was obtained a foam having a density of 20 kg/m³ and an average cell diameter of 1.0 mm, which was homogeneous and of high commercial value. The index S showing the surface structure was 0.83. Results obtained by evaluations made in accordance with the methods as described above are shown in Table 4.

EXAMPLE 4

To a mixture of 73% by weight of polystyrene (produced by Asahi Kasei K.K.; Styron 679; M.F.R.=24) and 27% by weight of a hydrogenated styrene/butadiene block copolymer A, 0.05% by weight of talc was added as a nucleating agent. The resultant mixture was dry-blended in a Henschel mixer and then thoroughly kneaded in a kneading extruder to obtain a mixture. The mixture obtained and polypropyrene (produced by Chisso Sekiyu Kagaku K.K.; K-1011; M.F.I. (230° C.×2.16kg)=0.7; density: 0.908 g/cc) was continuously fed to an extruder having a bore of 65 mm at the rate of 28.8 kg/hr and 31.2 kg/hr, respectively, to carry out melt kneading, and also, from an inlet for a blowing agent provided at a tip end of the extruder, a blowing agent mixture composed of dichlorotetrafluoroethane and methylene chloride in molar ratio of 8:2 was continuously introduced under pressure and at the rate of 20 kg/hr to carry out melt kneading at high temperature and under high pressure. Thereafter, the resultant melt was cooled to 143° C. in a cooling device, and extruded through a die comprising a slit of 1.0 mmt×30 mmW, a land of 4 mmL and a taper angle of 30° to a zone of atmospheric pressure to effect expanding. Shear stress ($\Delta P \times t/2L$) at the land portion was found to be 3.3 kg/cm². There was obtained a foam having a density of 25 kg/m³ and an average cell diameter of 0.7 mm, which was homogeneous and of high commercial value. The index S showing the surface structure was 0.80. Results obtained by evaluations made in accordance with the methods as described above are shown in Table 4.

COMPARATIVE EXAMPLE 3

Using low density polyethylene (produced by Asahi Kasei K.K.; Q902; M.I.=0.3; density: 0.920/cc) only, extrusion foaming was carried out by use of an extruder having a bore of 65 mm, following the procedures as in Example 1. In order to prevent the product from shrinking after foaming, stearyl amide was used as a shrinkage preventive agent in amount of 2 parts by weight based on 100 parts by weight of polyethylene to obtain a foam having a density of 25 kg/cm³, an average cell diameter of 1.0 mm and a closed-cell percentage of 100%.

Results obtained by evaluating the properties of the above foam according to the methods as described above are shown in Table 4.

COMPARATIVE EXAMPLE 4

Low density polyethylene (produced by Asahi Kasei K.K.; F-1920; M.I.=2.0; density: 0.919 g/cc) and 0.4 part by weight of talc as a nucleating agent were continuously fed to an extruder having a bore of 65 mm to carry out melt kneading. From an inlet for a blowing agent provided at a tip end of the extruder, dichlorotetrafluoroethane in amount of 14 parts by weight based on 100 parts by weight of the base material resin was introduced under pressure to carry out melt kneading at high temperature and under high pressure. Thereafter, the resultant melt was cooled to 106° C. in a cooling device, and extruded through a die to a zone of atmospheric pressure to effect expanding. There was obtained a foam having a density of 50 kg/m³, an average cell diameter of 1.0 mm and a closed-cell percentage of 100%.

Results obtained by evaluating the properties of the above foam according to the methods as described above are shown in Table 4.

COMPARATIVE EXAMPLE 5

60% by weight of low density polyethylene (produced by Asahi Kasei K.K.; Q902; M.I.=0.3; density: 0.920/cc), 40% by weight of polystyrene (produced by Asahi Kasei K.K.; Stylon 680; M.F.R.=7.5) and 0.1 part by weight of talc as a cell controlling agent were continuously fed to an extruder having a bore of 65 mm, followed by carrying out the same operations as in Example 1 to produce a foam. The foam thus obtained had a density of 25 kg/m³, an average cell diameter of 1.0 mm and a closed-cell percentage of 100%. For reference, the index S showing the surface structure was found to be 0.52.

Results obtained by evaluating the properties of the above foam according to the methods as described above are shown in Table 4.

COMPARATIVE EXAMPLE 6

Properties of the following commercially available foams were evaluated and shown together in Table 4.
Manufacturer: J company
Name: Polypropylene beads molded foam
Material: Polypropylene only
Shade and dimension: A plate of 50t×500w×500L
Main use: Cushioning package Manufacturer: K company
Name: Polystyrene beads molded foam
Material: Polystyrene only
Shape and dimension: A plate of 50t×500w×500L
Main use: Cushioning package Manufacturer: S company
Name: Beads molded foam
Material: Polystyrene-polyethylene copolymer
Shape and dimension: A plate of 50t×500w×500L
Main use: Cushioning package, heat insulating material was the one designated as "A" in Table 1 and the die used was modified to have an inner diameter of 60.0 mm and a circular slit of outer diameter of 61.8 mm (land: 2 mmL; taper angle: 20°), a foam in the form of a tube was obtained according to the inflation method by extrusion from a die to atmosphere. Here, the blow ratio (ratio of an average product diameter of a foam sheet to an average bore diameter of a die) was 4.4. The shear stress ($\Delta P \times t/2L$) at the land area was 3.24 kg/cm$^2$. The foam thus obtained was a foam having an average thickness of 5 mm, a width of about 828 mm and a density of 31 kg/m$^3$. This sheet was then cut into thin slices at the section in the thickness direction of the sheet by use of a meat slicer, and a thin piece obtained was microphotographed (x10). A straight line was drawn in the thickness direction of a middle portion of the microphotograph, and the number of single cells that across this straight line was counted to determine an average cell diameter based on the calculation formula as described above. The average value of the diameter calculated ten times was 0.5 mm. The index S showing the surface structure was found to be 0.81. As a result of

TABLE 4

| Sample | Foam density (Kg/m$^3$) | Compression creep (%) | Shear impact resistance (Limiting drop height for crack generation cm) | Bonding strength with corrugated fiberboard (Kg/cm$^2$) | Die-cutting workability | Performance deterioration after die-cutting working (%) | Vibration impact resistance thickness retention (%) | Lowering of repeated cushioning performance (%) |
| --- | --- | --- | --- | --- | --- | --- | --- | --- |
| No. 1 | 25 | 1.1 ◎ | 50 ◎ | 2.5 ◎ | ◎ | 11 ◎ | 75 ◎ | 23 ○ |
| No. 14 | 25 | 1.2 ◎ | 50 ◎ | 1.9 ○ | ◎ | 13 ◎ | 72 ◎ | 24 ○ |
| Example 3 | 20 | 1.4 ◎ | 50 ◎ | 2.3 ◎ | ◎ | 10 ◎ | 77 ◎ | 20 ○ |
| Example 4 | 25 | 0.9 ◎ | 50 ◎ | 2.6 ◎ | ◎ | 14 ◎ | 76 ◎ | 23 ○ |
| No. 6 | 25 | 0.8 ◎ | 50 ◎ | 2.6 ◎ | ◎ | 18 ○ | 35 x | 36 x |
| No. 7 | 25 | 1.5 ◎ | 50 ◎ | 2.5 ◎ | ◎ | 35 x | 65 ○ | 38 x |
| No. 8 | 25 | 1.3 ◎ | 25 x | 1.8 ○ | △ | 10 ◎ | 53 △ | 33 △ |
| No. 16 | 25 | 1.5 ◎ | 45 ○ | 1.1 x | x | 14 ◎ | 60 ○ | 28 △ |
| <Reference examples> | | | | | | | | |
| Comparative example 3 | 25 | 10.2 x | >50 ◎ | 2.3 ◎ | ◎ | 9 ◎ | 25 x | 11 ◎ |
| Comparative example 4 | 50 | 1.5 ◎ | >50 ◎ | 2.7 ◎ | ◎ | 40 x | 48 x | 32 △ |
| Polypropylene beads foam produced by J Co. | 20 | 6.0 x | >50 ◎ | 2.2 ◎ | ◎ | 13 ◎ | 40 x | 25 ○ |
| Polystyrene beads foam produced by K Co. | 22 | 0.7 ◎ | 10 x | 2.4 ○ | x | 85 x | 22 x | 70 x |
| Comparative example 5 | 25 | 1.1 ◎ | 25 x | 1.2 x | x | 38 x | 32 x | 38 x |
| Beads foam produced by S Co. | 32 | 1.0 ◎ | 50 ◎ | 2.6 ◎ | △ | 45 x | 71 ◎ | 50 x |

As can be seen from Table 4, the foams according to this invention is not only superior in the various properties required as cushioning materials under a large load (or a large stress), such as the compression creep and the repeatable cushioning performance, but also superior to conventionally known other foams in the resistance to shear impact, the resistance to vibration impact and the performance-maintaining property after die-cutting processing. Also, the foams of the invention are excellent in bonding strength to corrugated fiberboard and the die-cutting workability, and are endowed with features such that it is possible, although impossible in the conventionally known foams of polyethylene/polystyrene resin mixtures, to use extruded foam original plates as corner pads as they are.

EXAMPLE 5

In the same manner as in Example 1 except that the hydrogenated styrene/butadiene block copolymer used measuring the bonding strength to a corrugated fiberboard according to the method as described above, it was found to be 2.3 kg/cm$^2$, which was a foam of good quality.

COMPARATIVE EXAMPLE 7

A foam was produced in the same manner as in Example 5 except that the land and the taper in a die used was modified to 1.5 mmL and 45°, respectively. The shear stress ($\Delta P \times t/2L$) in the land area was 3.39 kg/cm$^2$. The foam thus obtained was a foam having an average thickness of 5 mm, a width of about 828 mm, a density of 32 kg/m$^3$ and an average cell diameter of 0.5 mm in the thickness direction. The index S showing the surface structure was found to be 0.45. As a result of measuring the joint strength to a corrugated fiberboard according to the method described in the body of this specification, it was found to be 1.2 kg/cm².

EFFECT OF THE INVENTION

As having been made clear from the above detailed descriptions, the invention, having been constituted as mentioned above, can for the first time provide the market with foams of polyolefin/polystyrene resin mixtures endowed with the cushioning properties (or the foam properties) that enables elastic cushioning of a large load.

The field of such cushioning design has heretofore attracted attention as a field which may create considerable demand. However, since no foams satisfying the required quality have been available, it is the field where no attempt has been made for any substantial development of the demand.

Accordingly, this invention, which can provide foams satisfying the required quality in the field where such foams have been sought after, is an excellent invention having a great role in the industrial fields.

I claim:

1. A foam of a polyolefin/polystyrene resin mixture obtained by mixing a polyolefin resin and a polystyrene resin in the presence of a hydrogenated styrene/butadiene block copolymer, and subjecting the resultant mixed resinous composition to extrusion foaming, wherein;
   (1) said hydrogenated styrene/butadiene block copolymer comprises, as components before hydrogenation, 10 to 38% by weight of styrene based on the total weight of said block copolymer before hydrogenation and butadiene having 1,2-bond type butadiene of 20 to 50% by weight based on the total weight of butadiene, and;
   (2) said foam comprises a thin surface skin portion showing a value of 0.65 or more of the surface structural index S represented by the following formula:

$$S = t/T \geqq 0.65$$

wherein t and T each represent a total light-transmission evaluated according to the method of ASTM D1003 with respect to a surface skin layer and an inner layer defined below; said surface skin layer means a layer cut out from the surface of a foam (an original plate) at an inner side in the thicknesswise direction and in the thickness dimension of 3 times the dimension of an average cell diameter of said foam, and said inner layer means a layer cut out from a middle portion of said form excluding said surface skin layer in the thicknesswise direction and in the thickness dimension of 3 times the dimension of the average cell diameter of said foam; and said average cell diameter is determined by drawing a straight line having a length (L) measured in the thicknesswise direction of the middle portion of the foam, counting the number of cells across said straight line and making calculations based on the following formula, and is indicated by an average value obtained by repeating the calculations 10 times:

Cell diameter (mm) = 1.626 × L mm ÷ cell number.

* * * * *